United States Patent [19]

Nitta et al.

[11] Patent Number: 4,888,823
[45] Date of Patent: Dec. 19, 1989

[54] SYSTEM FOR CONTINUOUS SPEECH RECOGNITION THROUGH TRANSITION NETWORKS

[75] Inventors: Tsuneo Nitta, Yokohama; Kensuke Uehara, Tokyo; Sadakazu Watanabe, Kawasaki, all of Japan

[73] Assignee: Kabushiki Kaisha Toshiba, Kawasaki, Japan

[21] Appl. No.: 101,789

[22] Filed: Sep. 28, 1987

[30] Foreign Application Priority Data

Sep. 29, 1986 [JP] Japan .................................. 61-227961

[51] Int. Cl.$^4$ ............................................. G10L 7/08
[52] U.S. Cl. ..................................... 381/43; 364/513.5
[58] Field of Search ............................. 381/41, 43, 45; 364/513.5

[56] References Cited

U.S. PATENT DOCUMENTS

| | | | |
|---|---|---|---|
| 4,590,605 | 5/1986 | Hataoka et al. | 381/43 |
| 4,624,010 | 11/1986 | Takebayashi | 381/43 |
| 4,624,011 | 11/1986 | Watanabe et al. | 381/43 |
| 4,625,287 | 11/1986 | Matsuura et al. | 381/43 |
| 4,677,672 | 6/1987 | Ukita et al. | 381/43 |
| 4,677,673 | 6/1987 | Ukita et al. | 381/43 |
| 4,715,004 | 12/1987 | Kabasawa et al. | 381/43 |
| 4,723,290 | 2/1988 | Watanabe | 381/43 |
| 4,736,429 | 4/1988 | Niyada et al. | 381/43 |

OTHER PUBLICATIONS

J.E.E. Journal of Electronic Engineering, vol. 22, No. 221, Jun. 1985, pp. 38–42, Tokyo, JP; K. Niyada: "A System that Breaks Words into Parts Provides Speaker-Independent Recognition".

Japan Telecommunications Review, vol. 24, No. 3, Jul. 1982, pp. 267–274, Tokyo, JP; N. Ishii et al.: "Speaker-Independent Speech Recognition Unit Development for Telephone Line Use", *Paragraph 3; FIG. 1*.

Proceedings of the IEEE Computer Society Conference on Computer Vision and Pattern Recognition, Washington, D.C., 19th-23rd Jun. 1983, pp. 83–88, IEEE; R. De Mori et al.: "A Network for the Recognition of a Large Spoken Vocabulary", *Para. 2,3; FIG. 1*.

"Trends in Speech Recognition"; Edited by W. A. Lea, 1980 (Speech Science Publications), Chapter 15, The Harpy Speech Understanding System.

Primary Examiner—William M. Shoop, Jr.
Assistant Examiner—Marc S. Hoff
Attorney, Agent, or Firm—Oblon, Spivak, McClelland, Maier & Neustadt

[57] ABSTRACT

Phoneme feature parameters are extracted from input digital speech signals by means of LPC analysis. Phonetic segments having phonetical meanings are obtained together with similarities to prescribed basic phonetic segments from the feature parameters to be passed through nodes of transition networks provided for each word. In passing the nodes, scores for similarity Sj of predetermined segments of the corresponding phonetic segments are made in selective scoring and the accumulation of the scores is used for recognition of continuous word speech.

12 Claims, 11 Drawing Sheets

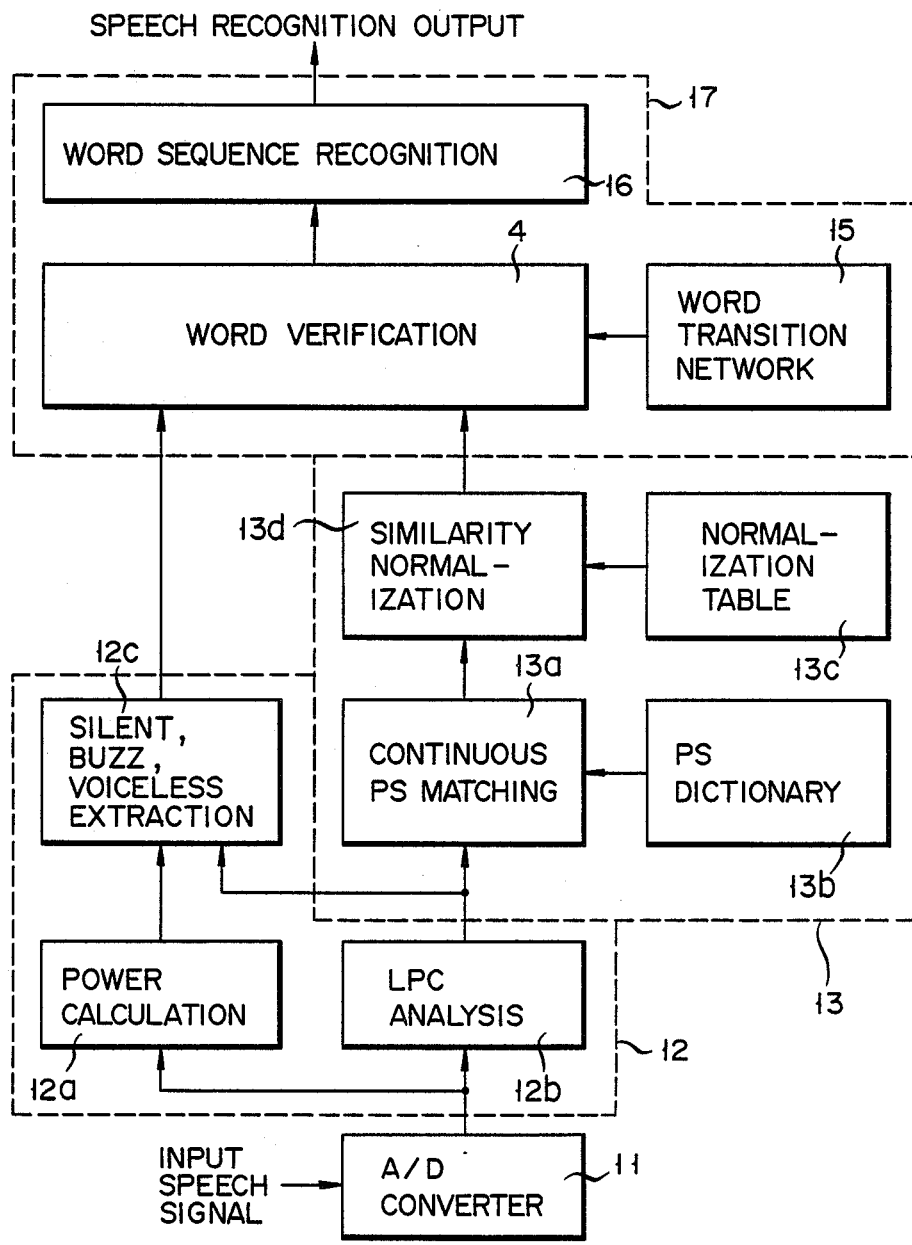
F I G. 1

FIG. 2B

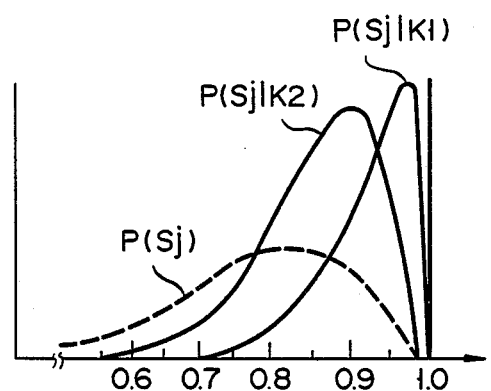
F I G. 3A
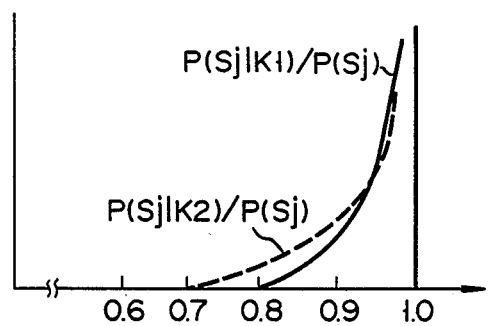
F I G. 3B
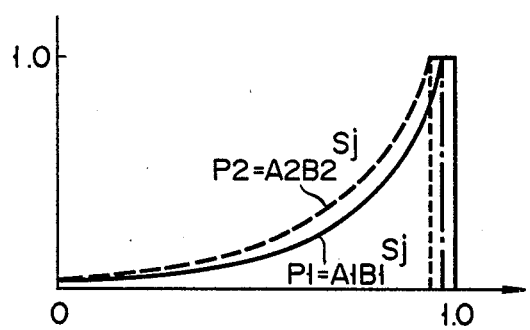
F I G. 3C

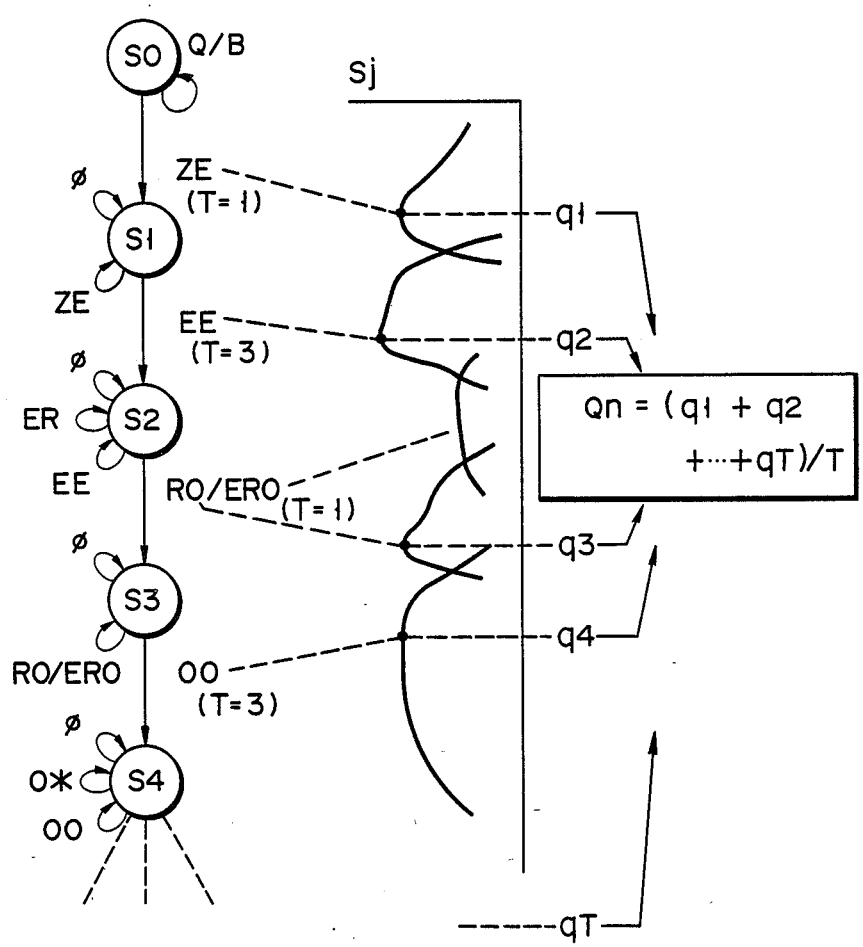
F I G. 5

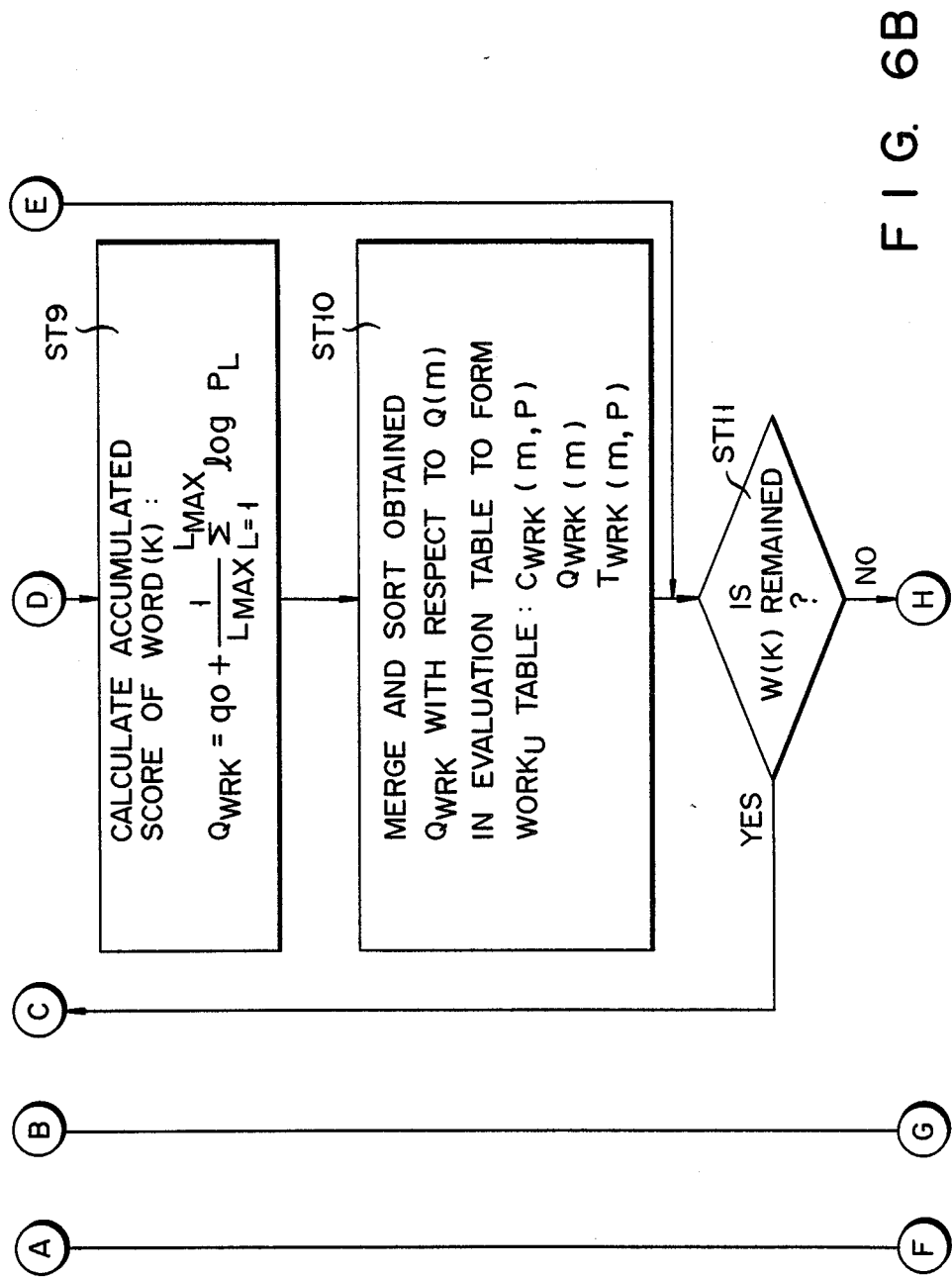

SYSTEM FOR CONTINUOUS SPEECH RECOGNITION THROUGH TRANSITION NETWORKS

Background of the Invention

Present invention relates to a system for recognizing continuous speech including a plurality of words.

Of late, attempts have been made in various ways to advance further from the system of recognizing word speech each in isolation to the development of a system for recognizing continuous speech including a plurality of words.

For example, continuous speech inputs are supplied to an acoustic analysis unit where phoneme feature parameters are found by means of a band pass filter being provided in the unit. The phoneme feature parameters are each verified with basic patterns for phonemes prior registered in the memory constituting a phoneme dictionary to obtain likely phoneme sequences in plurality according to degrees of similarity.

The obtained phoneme sequences for, and degrees of similarity to, the input speech is used to search for respective likely words of basic form in a word dictionary memory. The words of basic form are also used to obtain respective phoneme sequences in basic forms in the same manner as with the input speech. In fact, a phoneme sequence obtained from an input speech includes deformations occurred inside a word or at a boundary of two continuous words due to a co-articulation. Therefore, to the basic phoneme sequences thus found, deformations are added in accordance with predetermined phonological rules.

The basic phoneme sequence with deformations and the phoneme sequences of input speech are processed for matching to make recognition of the input speech according to the result of matching processing.

In the foregoing system for continuous speech recognition, an input speech is treated as a combination of phonemes for processing. In other words, phonemes are considered as segments for recognition. The processing of speech in the form of such a combination of phonemes has been known to be convenient for recognizing speech with regard to co-articulation of speech. However, the subdivision of recognition segments into the forms like phonemes require a lot of work in searching for a candidate word from phoneme sequence and also requires a dictionary of complicated compositions.

In particular, according to the method for continuous speech recognition, matching processings are continuously carried out for each recognition segment along the time axis, such that reckoning of phonemes as recognition segments brings forth a great deal of increase in the number of operational processings for matching. To deal with such a problem, some methods are proposed that reduce the number of phoneme feature parameters or lengthen the analysis intervals for input speech, that is frame cycles, to perform real time processing. However, these methods have the fault of reducing the reliability of the resultant recognition.

In employing syllables, instead of phonemes, for recognition segments, the basic form words read-out from a word dictionary may be used as is for matching with the words of the input speech without a need of obtaining phoneme sequences. In consequence, the verification of input words with the words in the dictionary becomes simple, while, on the other hand, speech recognition with regard to the influence of co-articulation becomes difficult to pose a problem of reducing the reliability of the resultant recognition.

SUMMARY OF THE INVENTION

The object of the present invention is to provide a system for continuous speech recognition that is capable of easily and accurately recognizing speech including a plurality of words continuously spoken.

According to the invention, the system for speech recognition comprises a means for extracting prescribed feature parameters from the input signals of continuous speech; a means for continuously matching the extracted feature parameters with the speech dictionary being composed of prescribed phonetically meaningful unit phonetic-segments to find similarity degrees for respective unit phonetic segments; a means of extracting candidate phonetic segment sequences up to the prescribed placing of order from the similarity degrees obtained; a plurality of transition networks composed for each word by using basic phonetic segment sequences; a means for passing extracted candidate phonetic segment sequence through the transition networks to perform word matchings; and a means for continuously combining the results of matchings to obtain recognition outputs.

BRIEF DESCRIPTION OF THE DRAWINGS

FIG. 1 shows a block diagram of a preferred embodiment of the invention;

FIG 2A–FIG. 2D, inclusive show phonetic feature parameters and phonetic segment labels for input speech arranged in order of similarity degrees;

FIG. 3A–FIG. 3C inclusive are graphs showing similarity normalization processes;

FIG. 5 shows a method of selective scoring of words during passing through the transition networks;

FIG. 6A–FIG. 6C inclusively show a flow chart illustrating operations of the system in FIG. 1 when a word passes through the transition networks.

DETAILED DESCRIPTION OF THE PREFERRED EMBODIMENT

Figure 2A:
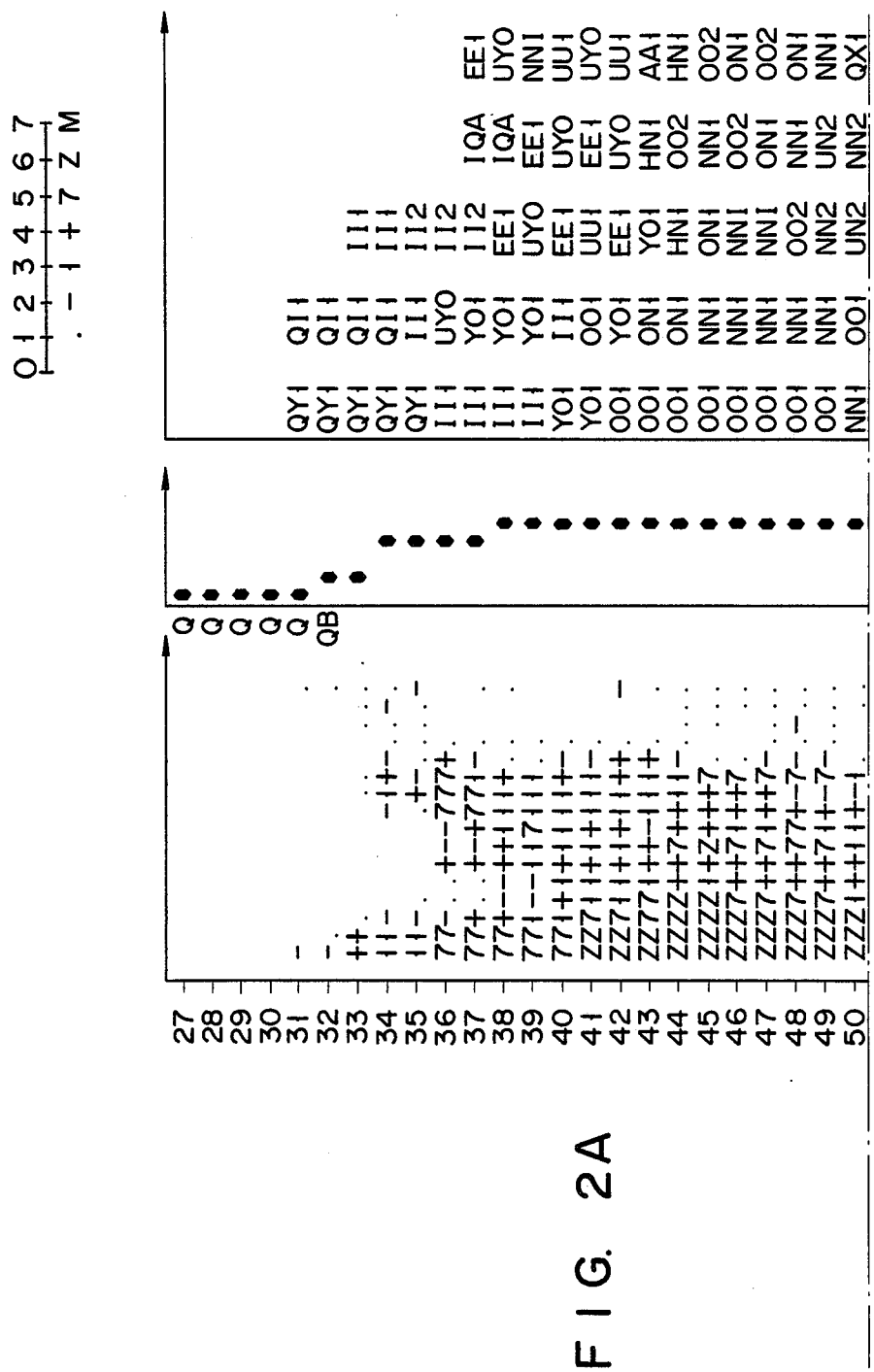

In reference to the drawings the preferred embodiment of the invention will be described in detail as follows.

In FIG. 1, continuous input speech signals are fed to an analog/digital (A/D) converter 11 and are quantized at a sampling frequency of, for example, 12 KHz to obtain a digital signal of 12 bits. For the description of the preferred embodiment, the recognition of inputs of speech continuously uttered for digits "4-8-2-0" will be taken as an example. The digital speech signals converted at A/D converter 11 are fed to power calculation section 12a and mel-cepstrum analysis section 12b employing linear predictive coding (LPC) in digital signal processor 12. For power calculation, power of input speech is calculated for every frame cycle of 8 msec that is the same as in LPC analysis, and the result is output to silent, buzz, voiceless extraction section 12c.

LPC analysis section 12b is an analysis section that employs LPC mel-cepstrum of 16 levels as analysis parameters at for example 16 msec for window length and 8 msec for frame cycle. Results of sound analyses made on the speeches for "4-8-2-0" by the use of mel-cepstrums are shown in FIGS. 2A–2D inclusive. In the Figures, the column farthest to the left shows frame Nos. 27 thru 145 of the cycle 8 msec. The next column to the frame No. column shows a power spectrum obtained from the 8 levels as shown at the upper right portion of FIG. 2A and the input speech levels within a frame of 8 msec are indicated with each of 16 frequency channels. In this case, for the levels in seven steps from one thru seven, symbols ". —, 1, +, 7, Z, M" are assigned as shown in FIG. 2A.

The symbol sequence for each frame thus obtained with the assignment of eight levels to 16 channels are transmitted as characteristic parameters for the input speech to silent, buzz, voiceless extraction section 12c and continuous PS matching section 13a of digital signal processor 13. PS herein is an acronym for phonetic segment to indicate a unit for speech recognition denoting a meaning phonetically as in the following.

Phonetic segments (hereinafter called as PS) employed for speech inputs in expressions of four arithmetical operations are classified into the following seventy-nine types.

(1) Continuant segments: these consisting of steady part of vowel and fricative consonant are expressed in the following twelve types:

AA1A, AA2A, 1I1A, 1I2A, UU1A, UU2A, EE1A, OO1A, OO2A, NN1A, NN2A, SS1C wherein the first three letters of the four letters in the PS codes indicate the type of PS categories. For example, AA1 indicates a steady part of a vowel "a" ([a]in phonetic symbol) and AA2 indicating a weak pronunciation "a" for the vowel "a". For all the vowels [a, e, i, o, u], codes AA, EE, II, OO, UU are used in the same manner as in the foregoing. The code NN corresponds to "N" and SS1 corresponding to a fricative sound [s].

Of the four letters the last letter A or C (other letters B, D and E may also be used) indicates the content of a combination of feature parameter patterns (to be explained later) including the (number of dimensions, number of frames). The content of the combination is expressed as follows,

A =(16, 4), B =(14, 6), C =(12, 8), D =(10, 10), E =(8, 12)

(2) Consonantal segments: these are segments including transient parts to vowels and are called demisyllables. Twenty-five PSs are comprised as follows.

QI1C, KA1B, KU1B, KE1B, SA1E, SU1E, TA1B, CI1D, NA1B, NA2B, NI1B, NI2B, HA1C, HA2B, HI1C, OY1E, RU2B, RO1B, R02B, WA1D, GO1D, GO2B, ZE1E, ZE2D, KY1E.

Whereas, QI1 indicates an initial vowel of a word starting with a silent letter (Q for silent), and NA1 and NA2 respectively indicate an initial consonant of na [na]and a consonant within a word (nana).

(3) Boundary segments: these segments express the boundary part between a vowel and a semi-vowel, the boundary part between a vowel and a consonant, and the boundary between a vowel and a silent part. Further, in expressing for boundary parts between vowel and semi-vowel, the following 18 types of PS are used.

AI1C, AN1A, AWAD, 1A1B, 1WAD, UI1C, UWAD, OI1C, ON1A, OWAD, NN1A, NWAD, YU1E, YO1E, UYOC, OYOD, AN1D, ON1D wherein AI1 indicates the boundary segment between vowels "a→i" [a →i], ON1 indicating a boundary segment between vowels "ɔ→n→i" that appear in the course of rapidly pronouncing for example "4-1" as in [jɔn -itʃi ]in Japanese.

Also, in expressing boundaries between the vowel and the consonant, the following 15 types of PS are employed.

AN2A, AH1A, AG1A, AR1A, IH1A, IX1A, IR1A, UN2A, UG1A, UR1A, UH1A, ER1A, OH1A, OX1A, OR1A wherein AN2 indicates the PS from a vowel "a" [ə]to the boundary between the vowel "a" and the consonant /n/. IX1 indicates a PS including /n/ and /G/ as X.

Further, for the boundaries between the vowel and the silent part, AQ1A, IQ1A, UA1A, OQ1A and NQ1A are employed as PS.

(4) Other phonetic segments: these segments include devoiced vowels and others and are expressed in four types such as

CO1C, KS1C, EROB, IQAB wherein CQ1C is a PS indicating the devoiced part in such speech as "1", "8" pronounced as "ICHI" , "HACHI" which are represented by the phonetical symbols [itʃi], [hʌtʃi]in Japanese, KS1C indicating transient part of from the devoiced part to the fricative part in pronouncing as "ROKU", "SAN" which are represented by the phonetical symbols [rɔku], [sʌn]for "6-3" in Japanese, EROB the co-articulation part occurring in pronouncing "zero" for "0" in rapid utterance, and IQAB the co-articulation part having a silent part (Q) in middle.

Thus, data for expressing 79 types of PS are stored in advance in PS dictionary 13b, which consists for example of ROM.

Boundary segments in (3) shall be described further in detail as follows.

(3-1) Vowel boundaries:

Ordinarily, the transient part occurring at the boundary between vowels $V_1$ and $V_2$ in the transient part from vowel $V_1$ to vowel $V_2$ is treated as a segment. Also, for example, the rapid transient parts in triad vowels (syllablic nasal "un" is also treated as vowel) $V_1$, $V_2$, $V_3$, that is the transient parts before and after $V_2$, occurring in a rapid speech made at the speed approximately ten syllables per second are counted into the recognition segments of this category.

(3-2), (3-3) Vowel-consonant or Vowel-silence boundaries:

The section from a vowel to a consonant (a transient part from a vowel to the consonant) is determined to be a recognition segment. As for consonants, they are segmented into small parts as consonants as well as transient parts to vowels), thus, stable recognition segments are formed in contrast to the conventional VCV or VC unit segments. Also, this segment unit deals with relatively small number (less than half the VCV unit) and short time range to an advantage on the amount of operation in continuous matching. As recognition segments for a continuous speech are continuously matched along time axis, labels (designation for recognition segments) relatively well corresponding to proper segments are obtained for consonants and vowels. However, as there have been prepared no special labels for the boundaries between vowel and consonant and between vowel and silent part, a random label sequence has appeared in the conventional speech recognition.

In such an event, matchings are carried out between input label sequence and standard label sequence on basis of DP (dynamic planning) to by-pass the section where random labels appear. However, although this method presents a convenient solution, the DP pass (by-pass) in actuality is subject to a limitation that reliable prevention of this random label section becomes rather difficult.

Conventionally, on the other hand, the segment VCV has been in use for a recognition segment. The purpose of the method was to stably recognize the consonant section by means of holding the consonant in between vowels. By means of employing this VCV method, corresponding labels may be obtained in relative stability.

However, since the number of VCV units amounts to 900 in Japanese, a problem of practical use remains to be solved. Further, the units concern long ranges of time that continuous matchings require a great increase of the amount of operation to an inconvenience.

Besides, the VCV units simultaneously embrace two factors for sectional transition as from a vowel V to a consonant C and from the consonant C to another vowel V such that pattern changes become great when viewed as recognition segments. In other words, to absorb the pattern changes a far greater data of speech shall be needed.

On the other hand, in the United States and Europe, sections CVC, CV and VC have been employed as segment units for speech recognition in many events. This practice is caused by the fact that their languages mostly end with a consonant in speech. When CVC is used as a recognition unit, a similar problem as in the VCV case will occur. As to CV, it may be considered as a relatively stable unit, but VC may not be considered as being spoken necessarily in stability.

On this point, the present invention, which adopts PS for segment units having different lengths, enables to well stabilize the recognition segments. Thus, PS segments representing features of silent such as CV, VC, CVC and C can be intentionally used. The number of these PS segments is less than those selected as a unit of CVC.

If the foregoing PSs are made to recognition segments, a problem shall be the number of levels or dimensions of feature parameters and time width (the number of frames) of the segments. That is, for the recognition of the steady part of vowel the number of levels for the feature parameters needs to be large while the number of frames may be small. For plosives, the number of levels and the number of frames for feature parameters need both to be large enough to a certain degree. Further, for fricatives, the number of levels for feature parameters may be small but the number of frames needs to be large.

Therefore, for recognizing a continuous speech with the number of levels and the number of frames of the foregoing parameters respectively set at the maximum, the amount of arithmetic operation for the continuous matching by section 13a in FIG. 1 shall expand into a great amount. Besides, the setting of the number frames at the maximum makes it difficult to catch the original phenomenon of short time to an inconvenience.

Therefore, for the preferred embodiment, the number of levels and the number of frames for the feature parameter of each recognition segment PS are, assuming the frame cycle for example as 8 m sec, to be selected from combinations,

A =(16, 4), B =(14, 6), C =(12, 8), D =(10, 10), E =(8, 12)

following the expression (number of levels of feature parameters, number of frames) of the foregoing. As a result, for the vowel the number of levels of the feature parameter shall be taken up to sixteen while for the fricative the number of frames is set at twelve.

Thus, the number of levels for the total of PS is restrained to the range 64 to 100 —79 for the preferred embodiment —that is about half the number of the case of setting the number of levels and the number of frames for the feature parameters respectively at the maximum. As the result, the amount of arithmetic operation for continuous matching may be held within the range of practical use.

As described in the foregoing, the employment of recognition segments different from one another in composition (number of levels for feature parameter and number of frames) makes it impossible to compare with one another the similarities (value of distance) that are obtained for each PS as the result of continuous matchings. In the preferred embodiment, the similarity $Sj$ (similarity at time j) is normalized to obtain a normalized scale which is used to verify words.

The similarity $Sj$ is normalized in the following manner.

When the label of an input PS is expressed as $Ki$, the probability of similarity to $Ki$ is assumed to be $Pr(Sj \mid Ki)$. Also, assuming all the appearance probability as $Pr(Sj)$ and the occurrence probability for $Ki$ as $Pr(Ki)$ and given a similarity $Sj$, the probability $Pr(Ki \mid Sj)$ of similarity $Sj$ belonging to $Ki$ is expressed by the following formula, $$Pr(Ki \mid Sj) = \frac{Pr(Sj \mid Ki) \times Pr(Ki)}{Pr(Sj)}$$

wherein $Pr(Kj)$ may be constant if each PS in the foregoing is to be considered as independent of one another. Also, the $Pr(Sj)$ is not to depend on the each PS.

Therefore, the $Pr(Sj \mid Ki)$ obtained in advance for each PS enables it to calculate the probability $Pr(Ki \mid Sj)$ in relative easiness. That is, $Pr(Sj)$ and $Pr(Sj \mid Ki)$ respectively calculated in advance from a great amount of speech samples make it possible to normalize the similarity $Sj$ by means of the foregoing formula.

However, the practical calculation by the formula is somewhat complicated that the following approximation is employed.

FIG. 3A shows probabilities $Pr(Sj \mid K1)$ and $Pr(Sj \mid K2)$ of similarity for two types of PS, that is K1 and K2, in contrast to all the appearance probabilities $Pr(Sj)$ of similarity. FIG. 3B shows $Pr(K1 \mid Sj)$ and $Pr(K2 \mid Sj)$ obtained for K1 and K2 of the two types. Employing these as models, the approximation by the following formula shall be made as in FIG. 3C.

$$K1 ; P1 = \begin{cases} A1B1\ Sj & (Sj \leq S_{max1}) \\ 1 & (Sj > S_{max1}) \end{cases}$$

$$K2 ; P2 = \begin{cases} A2B2\ Sj & (Sj \leq S_{max2}) \\ 1 & (Sj > S_{max2}) \end{cases}$$

Obtaining logarithms for both side members and considering that $$A1B1\ S_{max1} = 1,\ A2B2\ S_{max2} = 1,$$

expression may be made by formulas,

-continued $$K1 \; ; \; \log P1 = \log A1 + Sj \log B1$$
$$= 1 - (Sj - S_{max1})\log B1$$
$$K2 \; ; \; \log P2 = \log A2 + Sj \log B2$$
$$= 1 - (Sj - S_{max2})\log B2$$

Obtaining (log B1, $S_{max1}$) for each PS and tabulating them in a table, the new normalized scale of log Pi may be calculated easily.

As described above, the matching of the PS stored in PS dictionary with LPC mel-cepstrum is carried out at section 13a, of which continuous matching processing is performed with the use of the multiple LPC mel-cepstrum similarity measure expressed by the following formula, $$S_{Mc}^{(Ki)} = \left[ \sum_{m=1}^{M} W_m^{(Ki)} (c \cdot \psi_m^{(Ki)})^2 \right] / ||c||^2$$

wherein C indicates LPC mel-cepstrum, $$W_m^{(Ki)} \; \psi_m^{(Ki)}$$

respectively indicating a weight obtained from an eigenvalue and on eigenvector of the label of PS "Ki". And (·) represents an inner product and $||\;||$ represents a norm.

The similarity $Sj^{(Ki)}$ (similarity to the label of PS "Ki" at time j) obtained at section 13a is converted to a normalized scale at similarity normalization section 13d with the use of the value (log Bi, $S_{maxi}$) read out from the normalization table stored in advance in ROM 13c. The meaning of the normalization is already explained in the foregoing description.

For digital signal processors (DSP) 12 and 13 having such functions as in the foregoing, the Model No. TMS32010 manufactured by Texas Instruments Incorporated may be employed. More specifically, an LPC analyzer shown in a U.S. Patent application Ser. No. 07/9781 can be used as the LPC analysis section 12b. The continuous PS matching using PS dictionary performed at sections 13a and 13b may be realized by using such a circuitry shown in U.S. Pat. No. 4,624,011 issued on Nov. 18, 1986.

Figure 2B:
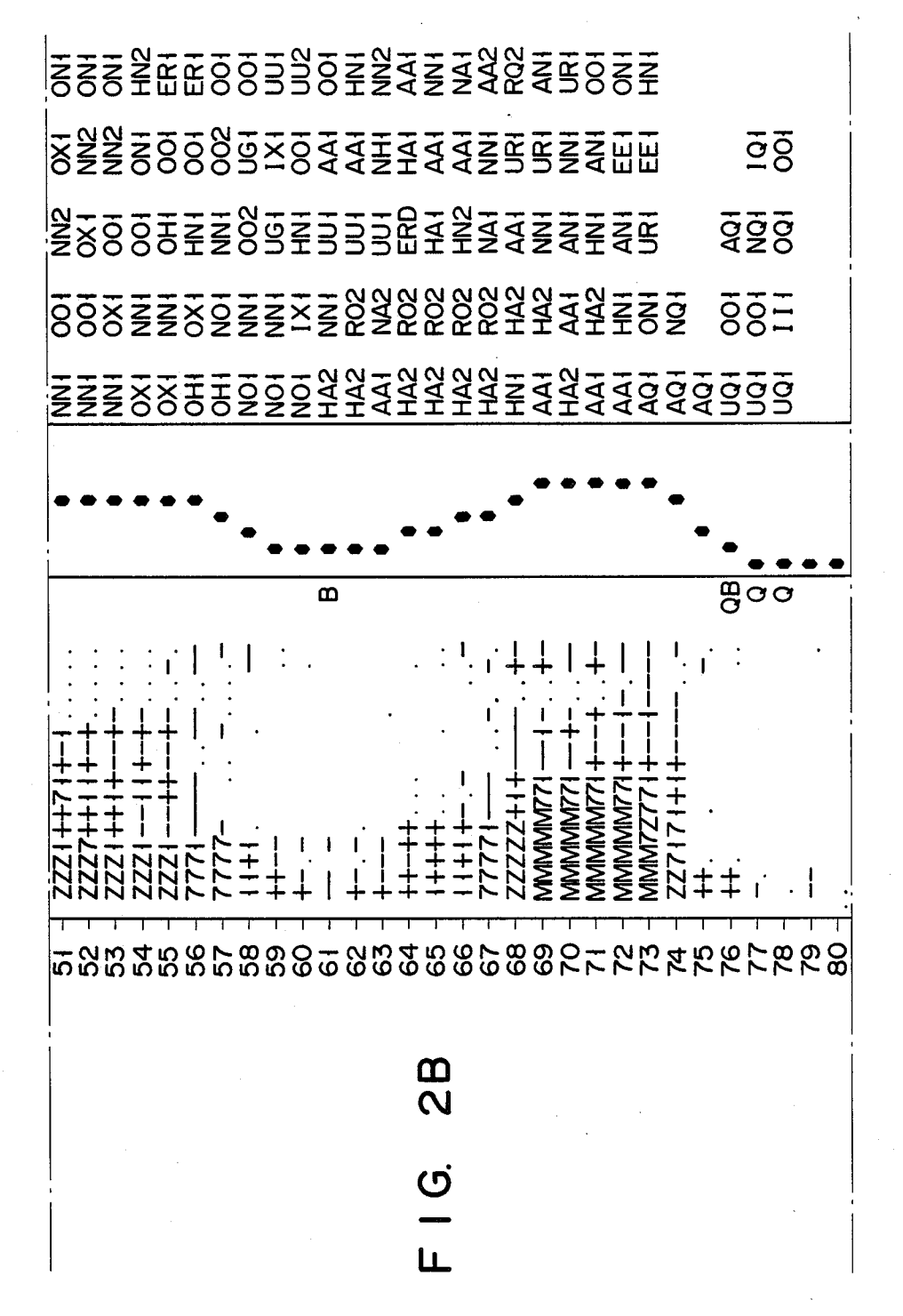
Figure 2C:
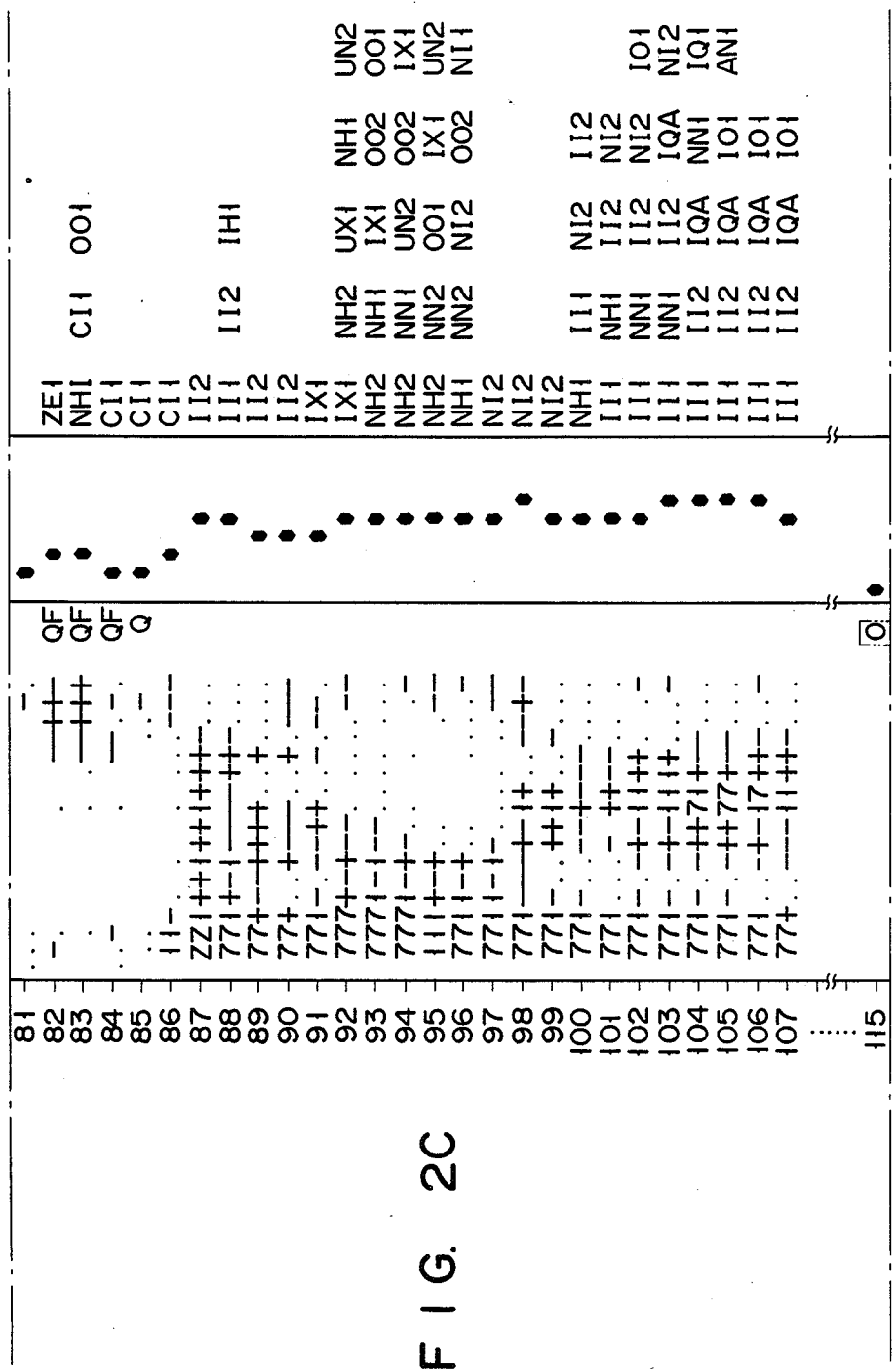
Figure 2D:
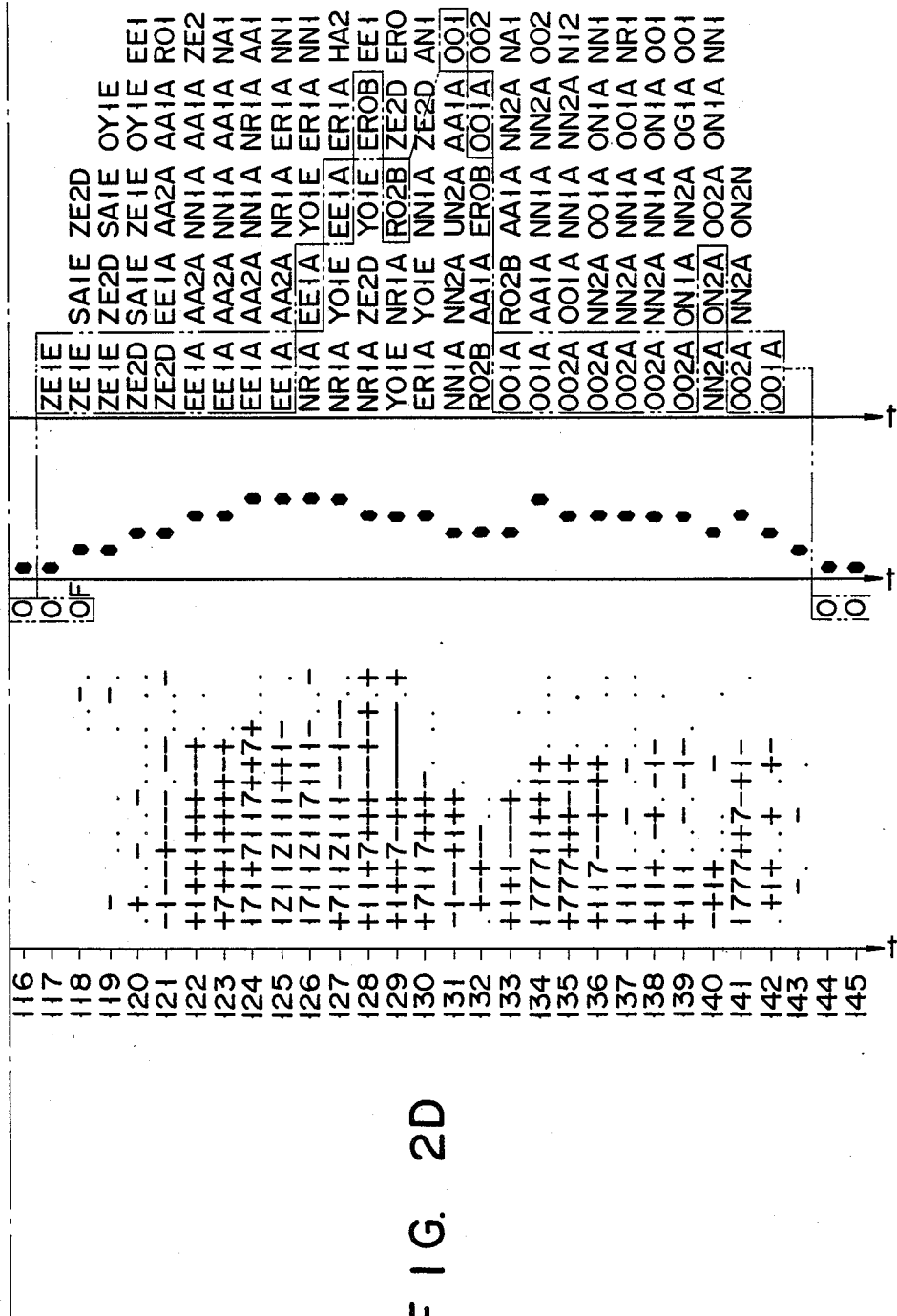

As for the labels of the PS obtained in the foregoing manner, examples with records made for each frame in the order of the normalized similarity are shown for the positions from first thru fifth places of similarity at the farthest column to the right in FIGS. 2A thru 2C. Also, at the column between a column of power spectrum obtained from the mel-cepstrum and the similarity column there are shown by means of black dots the power levels obtained for each frame from power calculation section 12a.

On the other hand, the power level data obtained from power calculation section 12a and LPC feature parameter data obtained from LPC analysis section 12b are transmitted to silent, buzz, voiceless extraction section 12c to obtain, when each frame section of the input speech becomes silent Q, buzz B or voiceless F, a label (Q, B or F) expressing any one of them and then fed together with the output of similarity normalization section 13d to word verification section 14, to which section 14 section 13d supplies the values from 1st thru 5th places of similarity $Sj^{(Ki)}$ converted to normalized scale values along with respective normalizing scale values.

The silent, buzz and voiceless extraction at section 12c can be performed by using any known system and a further explanation of the section is omitted here. For example, reference is made to IEEE TRANSACTIONS ON ACOUSTICS, SPEECH, AND SIGNAL PROCESSING, JUNE, 1976, PAGES 201-213, by BISHNU S. ATAL and LAWRENCE R. RABINER.

Further, although the foregoing embodiment performs respectively separate normalization processing for each PS, the normalization processing may be simplified by employing a single conversion table for table 13c for the case of having a little difference in value of (log Bi, $S_{max1}$) among different PSs.

Returning to FIG. 1, description shall be made about word verification section 14.

The PS sequence in 1st thru 5th places obtained from normalization section 13d are passed through the transition network read out from word transition network section 15 into section 14 to be considered as recognition word candidate. In the course of the transition network, values of log Pi for principal PSs are accumulated to calculate the score representing a likelihood as word.

The principal labels of PSs are:
(1) continuant segment (12 types),
(2) consonantal segment (25 types),
(3) boundary segments, particularly, those representing boundaries between the vowel and the semi-vowel (18 types),
(4) other segments (4 types).

As for the other boundary segments for example between the vowel and the consonant or between the vowel and the silent part, they are not used to obtain the calculation of word scoring in this embodiment.

The calculation of word scoring is made by the following formula, $$Pr(Wl \mid K1, K2, \ldots, K_{LMAX}) =$$
$$(\log P1 + \log P2 + \ldots + \log P_{LMAX}) \times \frac{1}{LMAX}$$

That is, assuming the principal PSs of word networks as K1, K2, ... and the values of the normalized scales corresponding to the principal PSs of the input PS sequence as log P1, log P2, ..., the unlikelihood of the input PS sequence to the word Wl is defined by the foregoing formula, that easily calculates a score for a word. The above formula expresses unlikelihood that the smaller the value the higher the likelihood becomes to word Wl.

Now, word transition network 15 shall be described.

Figure 4A:
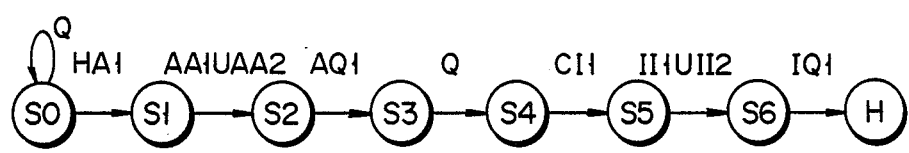
FIG. 4A–FIG. 4C inclusive show examplary sequences of steps for generating transition networks.

FIG. 4A shows a standard form for the transition network of a word "8" pronounced "hʌtʃi" (HACH1) in Japanese. The given word "8" will be substituted by PS expressions to form a standard transition network. Then, deformation processing for the boundaries occurring before and after the word "8" in relation to other words proceeds in order.

Figure 4B:
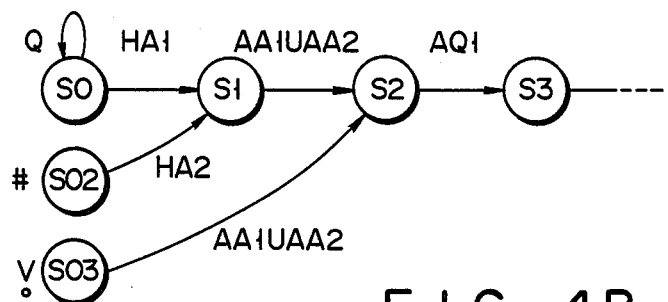

First, processing proceeds for starting node SO in the following manner. At first, search is made for a "deformation in word" in a prescribed rule. If the rule writes that "HA" may be substituted by a voiced sound "HA2" in the word as shown in FIG. 4B, a pass running from a new starting node S02 to node S1 is newly provided for "HA2". In this event, to the new starting node S02, information # indicating that there is an approaching voiced sound before the node "HA2" is attached.

Then search is made further for "deformation in word or for "exceptions" in the rule in the same manner as in the foregoing. For the present embodiment, the rule prescribes in its that "H" may be excluded; therefore, as shown in FIG. 4B, another pass running from another new starting node S03 to node S2 shall be added. With regard to this pass, before the node S03 information V is added to indicate an approaching silent section (exclusion of "H"). In this manner, deformation processing is made for the starting side of the transition network of the standard form in FIG. 4A.

Figure 4C:
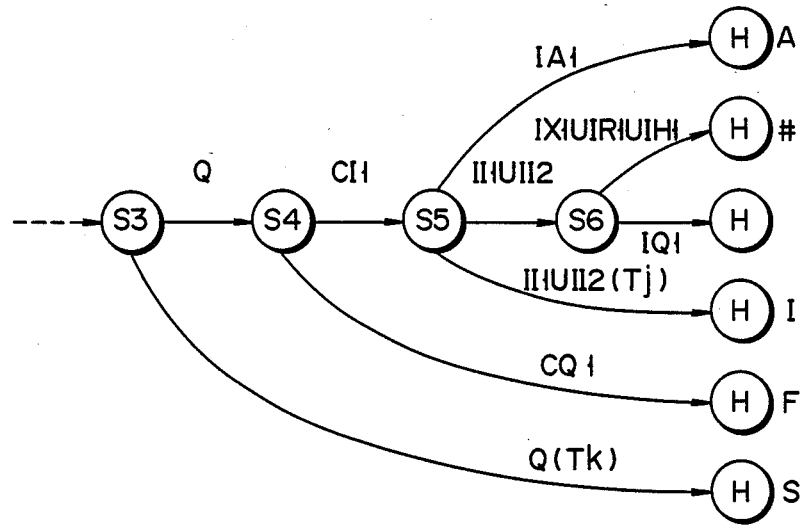

Next, modification processing proceeds for the terminal end side in the same manner as in the preceding. For this example, a search in the "connection rule" finds that ("in connecting with a voiced sound (#), 'IQ1' may be substituted by 'IX1, IR1 or IH1'"). As a result, a new pass is formed for status node S6 as shown in FIG. 4C, and information # is added to the terminal end node H of the new pass to indicate the term found in the rule. Similarly, "if a vowel 'i' follows, 'II2' (II1 may be included) may happen to continue beyond the Tj frames" shall be found. According to the rule, a new pass is formed from status node S5, and to the terminal H of the pass information I is added to indicate this term in the rule.

On the other hand, referring to the "devoiced rule", it is found that "if a voiceless consonant 'F' follows, a strong probability of devoicing (complete exclusion of vowel) may occur. Therefore, following the rule, a new pass is formed from status node S4 and information F is added to the terminal H to indicate the term found.

Further, following a rule saying "if a fricative S follows, silence 'Q' may continue beyond the Tj frames", a new pass is formed from status node S3 and information S is added to the terminal H of the pass to indicate the condition of the prescription.

Also, from the exclusion rule, a term "if 'CI' is devoices (weakly devoiced) in rapid voice, 'H' is omitted to be substituted by 'IA1'" is found. Therefore, similarly, a pass is formed from status node S5 and information A is added to the terminal H of the pass.

In this way, modification processing is made for the terminal end of the transition network to form a transition network with regard to the deformation of word boundaries. And the transition network program is stored in word transition network memory 15 to be supplied for word verification at word verification section 14.

Now, word verification section 14 makes verification processings in order for each word transition network stored in word transition network memory 15 and for the input PS sequence given as state before.

In the example shown in FIGS. 2A to 2C inclusive, PS sequence up to the 5th place and labels Q, B, or F are input and processed for matchings with transition networks of numeral words including "0, 1, ... 9" and of words indicating expression of four arithmetical operations comprising "t a su (addition), hiku (reduction), k a keru (multiplication), w a ru (division), and w a (sum)". In this case, it is found that word sequence only for "4, 8, 2, 0" reaches to the terminal end of the above transition network.

Further, the respective statuses of a transition network are each composed to be able to skip (don't care) for example up to three frames. However, if non-input of PS of more than three frames occurs, this state may be considered as non-pass of network.

The word PS sequences that passed through the word transition network are transmitted to word sequence recognition section 16 after obtaining the word score and information added to the terminal end node. Word sequence recognition section 16 makes selection of the optimum word sequence from the obtained word sequence and the accumulated score to obtain the continuous speech recognition output of "4-8-2-0" for the final.

Referring to FIG. 2C and FIG. 5, explanation will be made about the method of obtaining the word transition network of the word "0" (zero) in Japanese and the score of the word after passing through the network.

In FIG. 2C, frame 115 and 116 obtain silent label Q, while the starting node S0 stays at its own position along the return pass of the time of detecting silent Q or buzz B. Next, at frame 117, phonetic segment (PS) ZEIE is obtained. On obtaining "ZE" as the principal PS, the operation proceeds to the next node S1 in the transition network of the word "0" after running through the pass. Also, the value q1 of log Pi for "ZE" is obtained as the selective score.

For the PS of the 1st place of similarity, "ZE" is obtained continuously to the frame 119. In this case, is a new value q1 smaller than the former one is obtained, the value q1 is renewed by the smaller one. Next, label "EEIA" appears at frame 120. The network moves to next node S2 when "EE" appears for three frames, and value q2 of log Pi for "EE" of the PS is calculated.

"EE" of the PS is continuously obtained at first place of similarity up to frame 125 and then at 2nd place at frame 126 and further at 3rd place at frame 127. Meantime, the network stays at node S2 until the condition for pass to next node is satisfied. In this case, the value q2 is renewed since a smaller value is obtained.

The transition network of the word "0" is provided with a PS "RO" or "ERO" for the pass running from node S2 to node S3. Therefore, in the next frame 128, "EROB" at 4th place is obtained, such that the network moves from S2 to S3. Here, value q3 of log Pi for "ERO" of the PS is calculated. In this case, the former score q2 is added to the value q1. The frame 129 has a PS "R02B" whose score is compared with the value q3. When the score is smaller than q3, the value q3 is renewed.

Further, the network is provided with a pass running from node S3 to node S4 for "00" of the PS. Next frame 130 has no PS running through the pass; however, as described prior, the pass between each nodes of each network is able to skip (don't care) up to three frames that the frame 130 may be skipped over.

Next frame 131 obtains "001" at 5th place, frame 132 obtaining "001A" at 4th place. In succession, frame 133 obtains "001A" at 1st place. When three "00" appear continuously, the network moves from node S3 to node S4, and the minimum value q4 of log Pi for the principal PS "00" is calculated and the former value q3 is accumulated on the values of q1 and q2.

Frame 140 obtains "ON2A" at 2nd place and frames 141 and 142 respectively obtain "002A" and "001A", and then frames 144 and 145 obtains labels of silent Q to complete the transition network of the word "0". Meanwhile, the value q4 is renewed and finally renewed value q4 is accumulated on the values q1 to q3.

Accordingly, the score for the word "0" becomes a value which is obtained by dividing the accumulation value of q1 +q2 +q3 +q4 by 4. This accumulation value is transmitted to section 16 together with the word of recognition likelihood that passed through each transition network and continuous speech recognition is performed. Furthermore, sections 14, 15 and 16 may be constituted by a microcomputer 17 having a ROM for network memory 15.

Figure 6A:
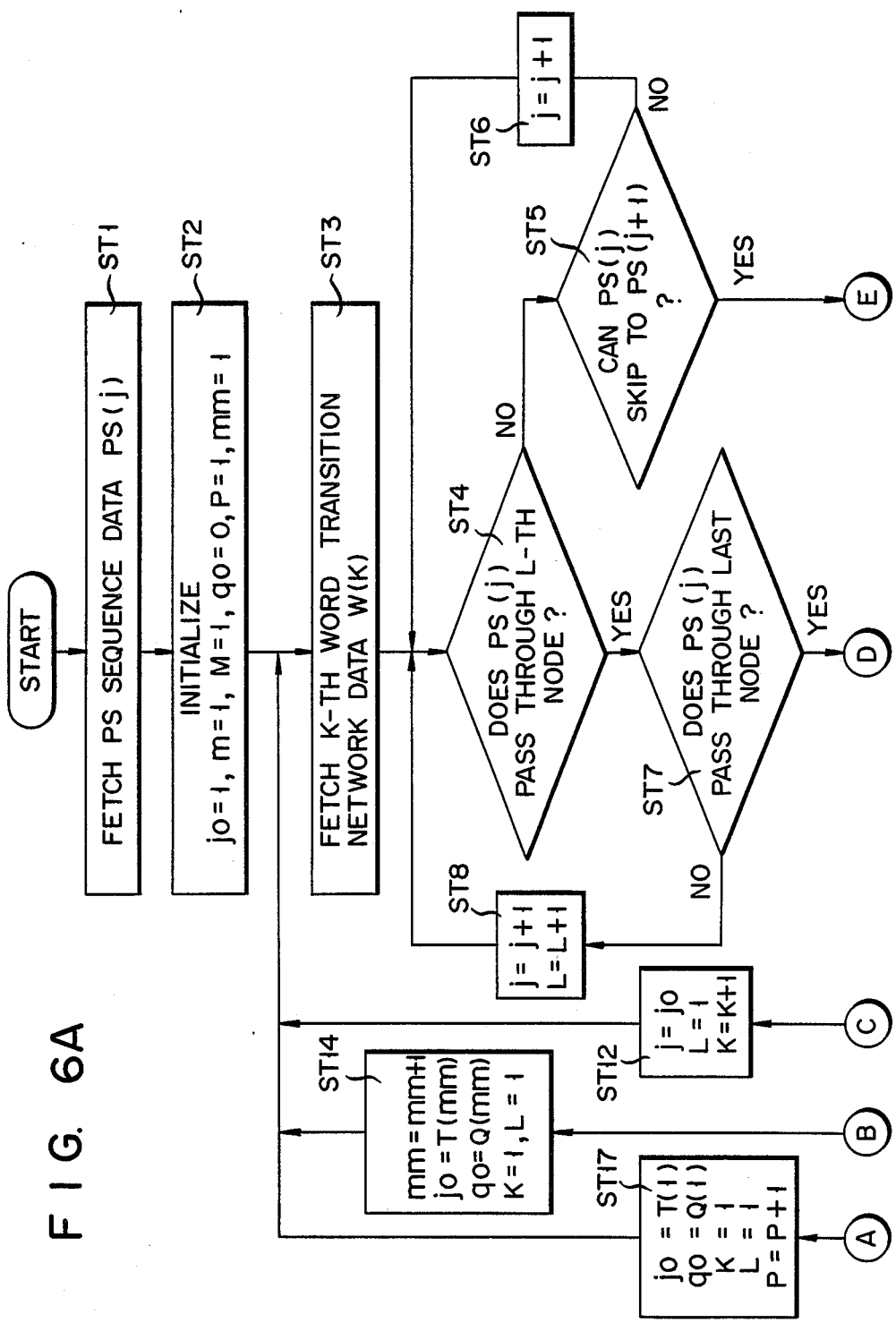
Figure 6C:
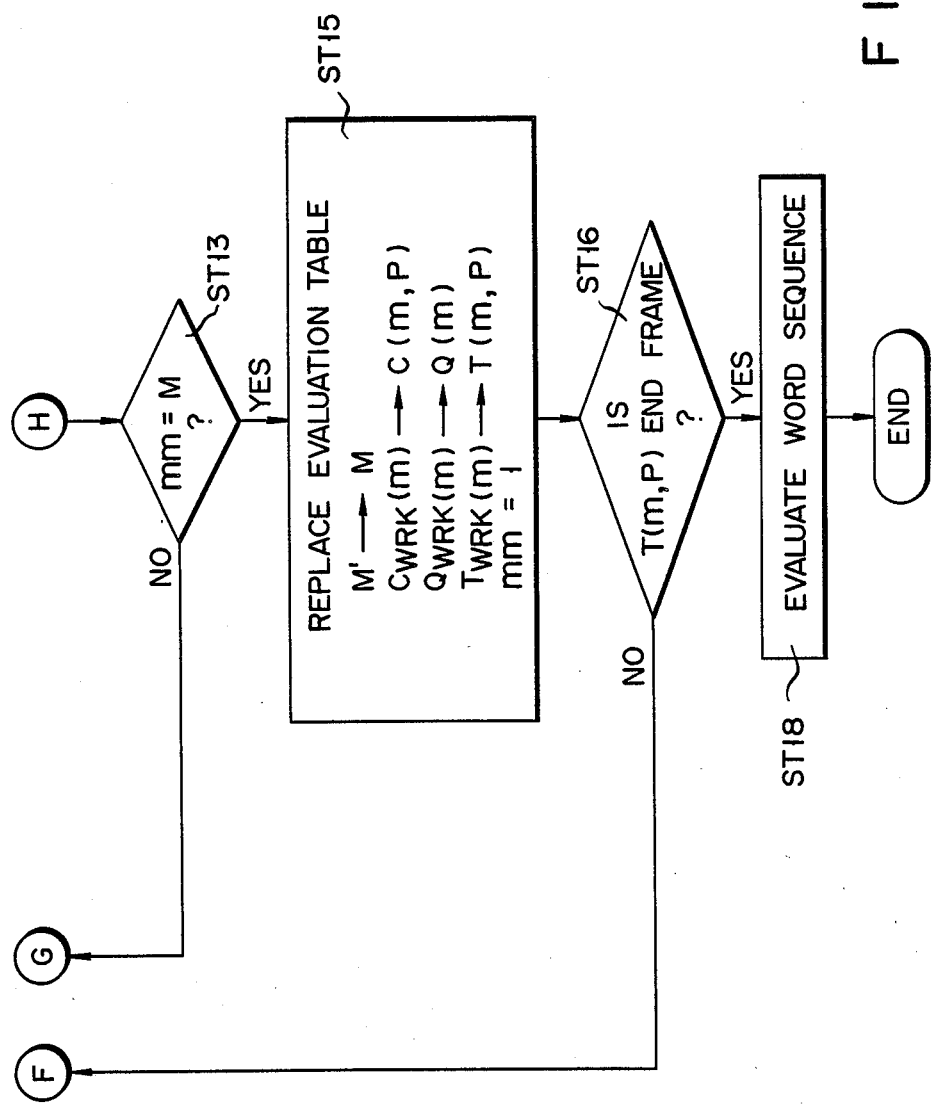

FIGS. 6A, 6B and 6C commonly show a flow chart schematically representing an operation of a CPU provided in microcomputer 17 constituting sections 14–16 of FIG. 1.

In the figure, PS sequence data PS(j) is fetched at a step ST1. In step ST2, all the contents of the microcomputer 17 is initialized. Thus, a search initiating value for the data PS(j) j0 is set as J0 =1, place of the similarity m (m =1, 2, ..., 5) is set as m =1, a final place M (max. 5) is set as M =1, the accumulated score q0 is set as q0 =0, and the place mm (mm =1, 2, ..., max. 5) of the word sequence under recognition is set as mm =1. When the initialization is completed, the operation goes to the next step ST3 where a k-th word transition network data w(k) is fetched. In the next step ST4, check is made whether the PS(j) fetched in the step ST1 pass through the L-th node (L =1, 2, ...,). When non-passing occurs at the L-th node, check is made in the next step ST5 whether PS(j) can skip to the next PS(j+1). If YES is obtained in step ST5, a skip operation j =j +1 is performed at step ST6 and the operation returns to the top of step ST4. If NO is obtained in step ST5, the operation is shifted to step ST11 wherein check is made whether the network data w(k) is remained.

When YES is obtained in step ST4, check is made in step ST7 whether PS(j) pass through the last node. If NO in step ST7, the operation returns to step ST4 through step ST8 in which an increment operation, j =j +1, L =L +1, is made.

If YES in step ST7, an accumulated score QWRK with respect to the passed word k is obtained in step ST9 in the following manner.

$$QwWRK = q0 + 1/Lmax \sum_{L=1}^{L_{MAX}} \log PL.$$

When the accumulated score is obtained, the operation goes to the next step ST10, wherein the obtained accumulated score QWRK is merged and sorted (into 1st to 5th places) with respect to data Q(m) in the evaluation table to form the WORK TABLE.

CWRK (M,P): Category sequences of 1st to M'-th places.

QWRK (M): Accumulated score of 1st to M'-th places.

TWRK (m,P): Sequences of end frames of 1st to M'-th places.
When 1st to 5th places in the evaluation table is filled with Q(m), it is assumed that M' =M =5, while if the 1st to 5th places is not filled with Q(m), M' =M +1 is performed in the step ST10.

After the step ST10 the operation goes to the step ST11. If a transition network W(k) still remains in the memory 15, the operation returns to the step ST3 through a step ST12, wherein the setting of j =j0, L =1 and K =K +1 is performed.

If NO is obtained in step ST11, next step ST13 is performed. In the step ST13, check is made whether unevaluated place (m) still remains in the evaluation table. If a resultant of the check shows that mm =M, YES is obtained in the step ST13 and the operation returns to the step ST3 through step ST14 wherein data or program setting is performed in the following manner:

MM =MM −1, j0 =T(mm), q0 =Q(mm), K =1, and L =1 .

If YES is obtained in the step ST13, the operation advances to next step ST15 wherein the replacement of the evaluation table is performed in the following manner:

M →M
CWRK (m) →C (m, P)
CWRK (m) →Q (m)
TWRK (m) →T (m,P)
mm =1 .

After the replacement of the evaluation table is completed, the operation advances to step ST16 wherein check is made whether all the contents in T (m,P) table reach at end frame. If NO in the step ST16, the operation returns to the step ST3 through a step ST17 where data setting is performed in the following manner:

j0 =T(1), q0 =Q(1), K =1, L =1, and P =P +1 .

If YES is obtained in the step ST16, the operation advances to the next step ST18 wherein an evaluation of the word sequences are performed by taking a word sequence having the 1st place of C (1,P) and an accumulated score having the 1st place of Q (1,P) so that a given word likelihood sequence is recognized as input continuous speech and is output as speech recognition output.

Further, in the preferred embodiment in FIG. 1, DSP 12 for obtaining LPC mel-cepstrum, speech sound power, silent buzz or voiceless label output as feature parameters from input speech signals and DSP 13 for obtaining PS sequence and values of normalized similarities may employ for their use Model No. TMS32010 by Texas Instruments Incorporated disclosed in USP No. 4,624,011. Therefore, descriptions about DSPs 12 and 13 shall be omitted.

As described above, the present invention regards as recognition unit the unit PS having a phonetic meaning and carries out recognition processing by means of word transition networks so as to effectively provide for deformations of vowels and consonants occurring in continuous speeches and accurately recognize speeches continuously uttered. Besides, the word transition networks may be easily formed from the word dictionary compiled with standard forms, and evaluation of word is performed by the selective scoring for principal PSs such that operational processing is easy and relatively small in amount to perform accurate speech recognition.

What is claimed is:

1. A speech recognition method comprising the steps of: extracting prescribed feature parameters from input signals for continuous speech sounds; obtaining similarities by continuously matching the extracted feature parameters with a voice dictionary composed of phonetic segment units having prescribed phonetic meanings; extracting sequences of phonetic segments to a prescribed placing of order based on the obtained similarities; for each of standard words passing the phonetic segment sequence through presupplied transition networks; and evaluating the word sequence passed through transition networks in accordance with similarities and obtaining recognition outputs.

2. A system for speech recognition comprising:

a means for extracting prescribed feature parameters including a series of labels of phonetic segments of each word included in an input speech from input signals for continuous input speeches;

a means for continuous matching of the extracted feature parameters with a voice dictionary compiled of phonetic segment units having prescribed phonetic meanings and for obtaining similarities on the phonetic segment units;

a means for extracting a sequence of a plurality of phonetic segment likehoods up to a prescribed placing of order based on the similarities;

a plurality of transition networks formed for each word by use of standard phonetic segment sequence;

a means of passing the extracted phonetic segment likelihood sequence through the transition networks to perform word matchings; and, a means for continuously combining the results of word matching to obtain recognition outputs; wherein said word matching means includes a means that for each word likelihood the normalized standard values for the similarities corresponding to phonetic segments in the transition networks and obtains an accumulated score by means of selective scoring of values of said labels.

3. A system for speech recognition comprising:

means for extracting prescribed feature parameters including phonetic segment units and a label sequence composed of a series of labels each having its corresponding value and representing prescribed features of phonetic segment units from input continuous speech signals;

means for obtaining similarities on the phonetic segment units extracted from input continuous speech signals by executing continuous matching of the extracted phonetic segment units with a voice dictionary compiled of the phonetic segment units having prescribed phonetic meanings so that a sequence of a plurality of similarities is obtained;

means for converting the similarity of phonetic segment obtained by the similarity obtaining means into a normalized similarity having a normalized standard value;

means for extracting a sequence of a plurality of phonetic segment likelihoods up to a prescribed placing of order based on the normalized standard values of the normalized similarities;

means for selectively scoring the values of the labels with respect to predetermined phonetic segments except for transitional phonetic segments obtained in said feature parameter extracting means by accumulating the values of the labels;

plurality of transition networks formed for each word included in the input speech by use of standard phonetic segment sequence;

means for passing the extracted phonetic segment likelihood sequence through said transition networks by referring to a selectively scored value obtained in said scoring means for performing word-by-word matching; and means for continuously combining results of the word-by-word matching to obtain recognition outputs of the input speech.

4. A system according to claim 3, wherein the predetermined phonetic segments include continuant segments having a vowel steady part and a fricative consonant, consonant segments having transient parts to vowels, boundary segments expressing the boundary between a vowel and a semi-vowel, and devoiced vowel parts.

5. A system according to claim 3, wherein said predetermined phonetic segments is prepared by excluding a transient part between first syllable and second syllable including the silent part.

6. A system according to claim 3 inclusive, wherein the means for obtaining recognition outputs includes a means that for all the words adds up accumulated scores obtained for each word passed through the transition networks to obtain a total value, and a means of comparing the total value with the standard value.

7. A system according to claim 3, wherein said extracting means includes an analyzing means employing mel-cepstrum as an analytic parameter in linear predictive coding analysis.

8. A system according to claim 3, wherein the voice dictionary includes phonetic segments expressed in prescribed labels, and said similarity obtaining means includes means for matching the prescribed label sequence with labels stored in said voice dictionary.

9. A system according to claim 3, wherein said converting means includes normalization constant tables.

10. A system according to claim 9, wherein a plurality of normalization constant tables are provided for each phonetic segment.

11. A system for speech recognition comprising:

means for extracting prescribed feature parameters including phonetic segment units and a label sequence composed of a series of labels, each having its corresponding value and representing prescribed features of phonetic segment units from input continuous speech signals;

means for obtaining similarities on the phonetic segment units extracted from input continuous speech signals by executing continuous matching of the extracted phonetic segment units with a voice dictionary compiled of the phonetic segment units having prescribed phonetic meanings so that a sequence of a plurality of similarities is obtained;

means for converting the similarity of phonetic segment obtained by the similarity obtaining means into a normalized similarity having a normalized standard value;

means for extracting a sequence of a plurality of phonetic segment likelihoods up to a prescribed placing of order based on the normalized standard values of the normalized similarities;

means for scoring the values of the labels with respect to phonetic segments except for transitional phonetic segments obtained in said feature parameter extracting means by accumulating the values of the labels;

plurality of transition networks formed for each word included in the input speech by use of standard phonetic segment sequence;

means for passing the extracted phonetic segment likelihood sequence through said transition networks by referring to a scored value obtained in said scoring means for performing word-by-word matching; and means for continuously combining results of the word-by-word matching to obtain recognition outputs of the input speech.

12. A system for speech recognition comprising:

means for extracting prescribed feature parameters including phonetic segment units and a label sequence composed of a series of labels each having its corresponding value and representing prescribed features of phonetic segment units from input continuous speech signals;

means for obtaining similarities of the phonetic segment units extracted from input continuous speech signals by executing continuous matching of the extracted phonetic segment units with a voice dictionary compiled of the phonetic segment units having prescribed phonetic meanings so that a sequence of a plurality of similarities is obtained;

means for extracting a sequence of a plurality of phonetic segment likelihoods up to a prescribed placing of order based on the similarities;

means for selectively scoring the values of the labels with respect to predetermined phonetic segments except for transitional phonetic segments obtained in said feature parameter extracting means by accumulating the values of the labels;

plurality of transition networks formed for each word included in the input speech by use of standard phonetic segment sequence;

means for passing the extracted phonetic segment likelihood sequence through said transition networks by referring to a selectively scored value obtained in said scoring means for performing word-by-word matching; and means for continuously combining results of the word-by-word matching to obtain recognition outputs of the input speech.

* * * * *